April 30, 1968   G. W. DEEMIE ET AL   3,380,641
DISCONNECT DRIVE FOR INERTIAL WELDER SPINDLE
Filed July 5, 1966   6 Sheets-Sheet 2

INVENTORS.
GERALD W. DEEMIE
IRA H. SAGE
SASHA KOMSA
ALPHONZO RAKUS
RALPH W. YOCUM
BY Fryer, Tjensvold, Feix & Phillips
ATTORNEYS INVENTORS.
GERALD W. DEEMIE
IRA H. SAGE
SASHA KOMSA
ALPHONZO RAKUS
RALPH W. YOCUM BY Fryer, Tjensvold, Feix & Phillips
ATTORNEYS

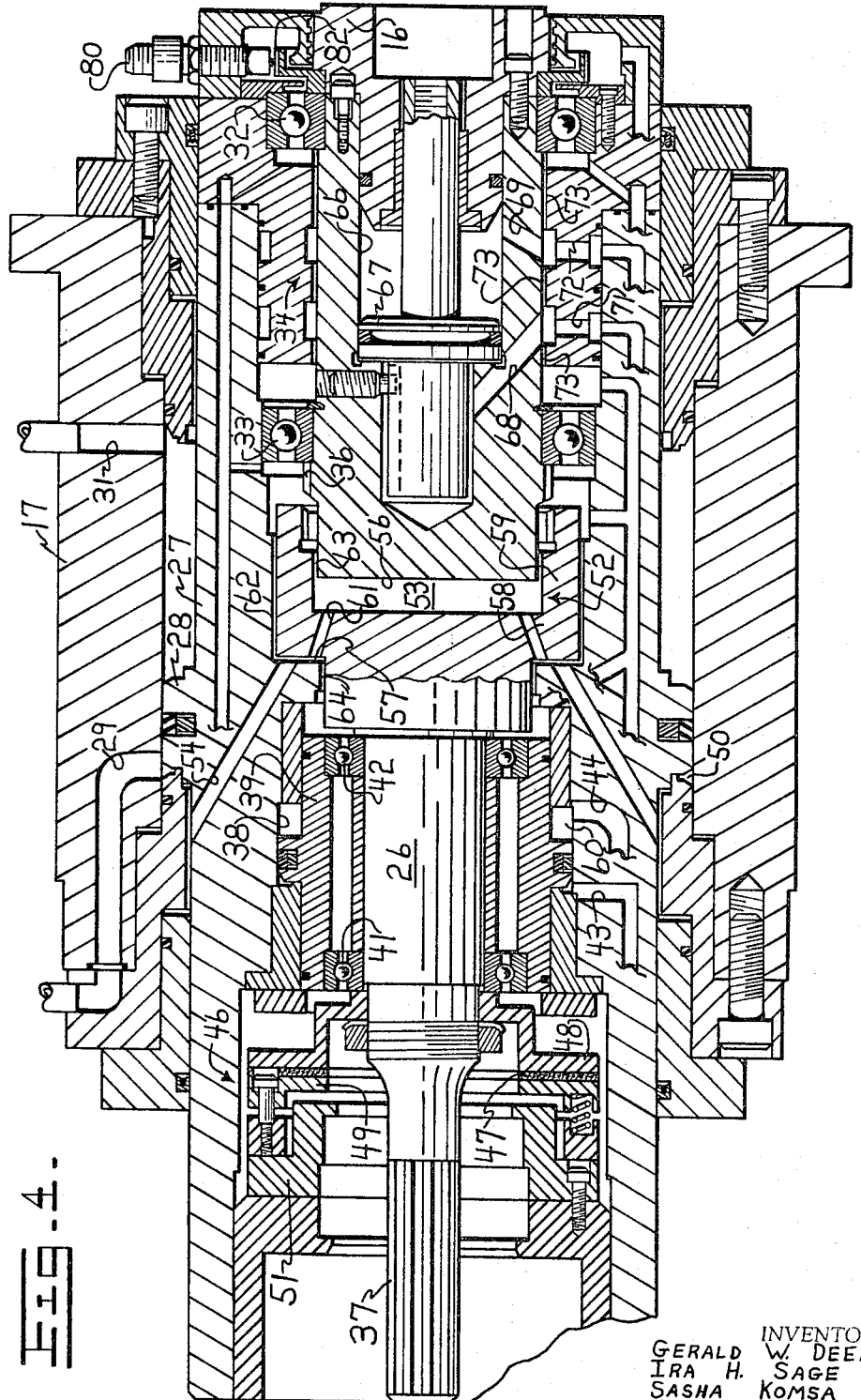

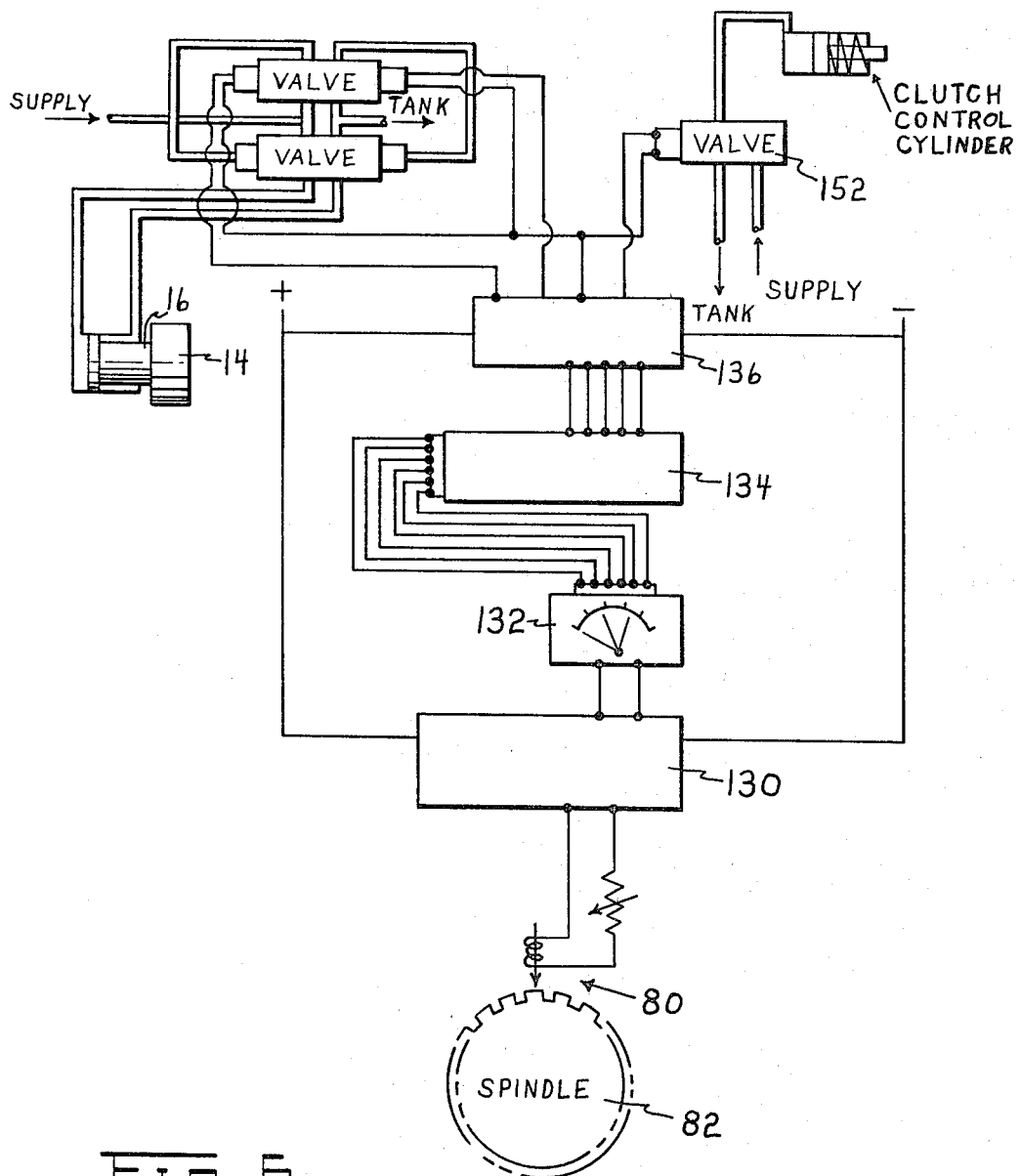

April 30, 1968  G. W. DEEMIE ET AL  3,380,641
DISCONNECT DRIVE FOR INERTIAL WELDER SPINDLE
Filed July 5, 1966  6 Sheets-Sheet 6
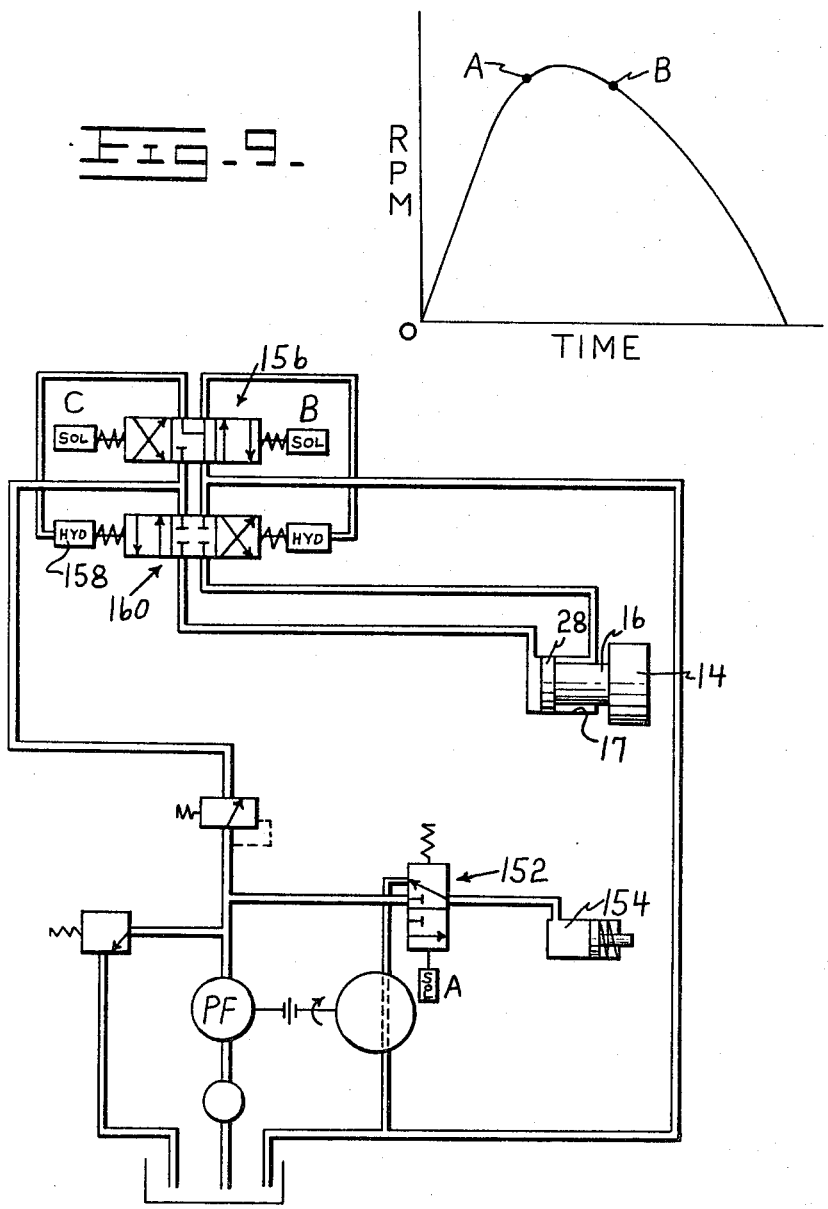
INVENTORS.
GERALD W. DEEMIE
IRA H. SAGE
SASHA KOMSA
ALPHONZO RAKUS
RALPH W. YOCUM
BY
Fryer, Ginwald, Feist Phillips
ATTORNEYS

United States Patent Office 3,380,641
Patented Apr. 30, 1968

3,380,641
DISCONNECT DRIVE FOR INERTIAL WELDER SPINDLE
Gerald W. Deemie and Ira H. Sage, Peoria, Sasha Komsa, Washington, and Alphonzo Rakus and Ralph W. Yocum, Peoria, Ill., assignors to Caterpillar Tractor Co., Peoria, Ill., a corporation of California
Filed July 5, 1966, Ser. No. 562,743
13 Claims. (Cl. 228—2)

This invention relates to an inertial welding machine of the kind in which end surfaces of two parts to be welded are pressed together while the stored energy of rotating inertial weights rotates the parts in rubbing contact to heat the engaged surfaces to a plastic weldable condition. This invention relates particularly to a disconnect drive arrangement for the spindle of the welding machine which enables the machine to operate with a minimum inertial mass under certain conditions of use.

In the inertial process for welding parts an inertial mass is connected for rotation with one part and all of the energy for heating the interface to a plastic weldable condition is stored in the rotating inertial mass before the parts are engaged in rubbing contact. The inertial process offers many advantages over the prior art friction welding techniques. The amount of energy put into the weld can be controlled with precision. The heating time is very short. Control of process parameters is simplified. And the physical forces exerted on the plastic weld zone produce quite fine grain structure and uniform high quality in the products welded by the process. These and other advantages and a description of the manner in which these advantages are obtained are set out in detail in U.S. application Ser. No. 407,955 filed Oct. 27, 1964, now Patent No. 3,273,233.

With most materials it is important that the process parameters, including the total amount of energy put into the weld, be controlled within rather close limits. As a result, there is a limit on the smallest size weld that can be produced with any particular welding machine. The inertia that is inherent in certain rotating parts of the machine puts a lower limit on the minimum amount of energy that can be put into the weld.

It is therefore a primary object of the present invention to reduce the inertia of the rotating elements of the machine to a minimum so that, with all control weights removed, the lower range of part sizes that can be welded with a particular machine can be considerably extended.

This object is accomplished in the present invention by a disconnect drive arrangement for the spindle which permits all of the drive train to be disconnected from the spindle before the parts to be welded are engaged in rubbing contact. Thus, with all control weights removed, the only inertial energy transmitted to the weld is that which is developed in the spindle and the chuck. Since the inertia of these components can be kept low, quite small parts can be welded on the same machine that will weld large parts when control weights are added to the spindle.

It is a further object of the present invention to incorporate a hydrostatic bearing behind the spindle in a way that permits a coupling member to be axially shiftable within the hydraulic chamber of the hydrostatic bearing without interfering with the hydrostatic support of the spindle. It is a related object to disconnect the coupling member from the spindle during a period when no drive torque is being transmitted between the coupling member and the spindle.

It is another object of the present invention to incorporate a hydrostatic drive as the transmission between the motor and the spindle. The hydrostatic drive is a highly efficient transmission for accelerating the spindle and control weights to the desired rotational speed. The hydrostatic drive provides a continuously variable drive ratio and also acts as a clutch to disconnect the motor from the spindle when the spindle has reached the desired rotational speed.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

In the drawings:

FIG. 4 is a cross-section view of a combined load cylinder and spindle for the machine shown in FIG. 1 and shows details of the disconnect drive arrangement for the spindle;

FIGS. 6, 7 and 8 are schematic views of a control circuit for the machine shown in FIG. 1;

FIG. 9 is a plot of spindle speed versus time and illustrates the point at which the spindle is disconnected from the drive shaft during a period of no torque after the drive shaft has been disconnected from the drive motor.

Figure 1:
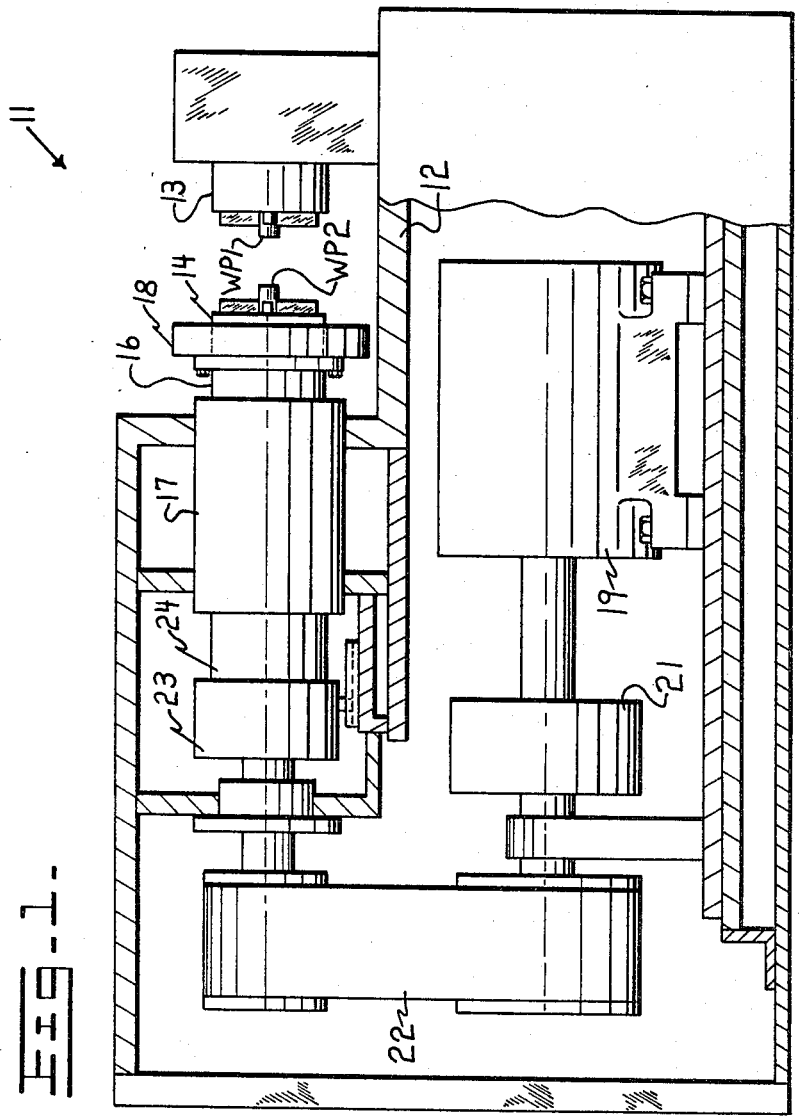
FIG. 1 is a side elevation view, partly broken away to show details of construction, of a welding machine constructed in accordance with one embodiment of the present invention.

In FIG. 1 a welding machine constructed in accordance with one embodiment of the present invention is indicated generally by the reference numeral 11.

The machine 11 includes a frame 12, a stationary, non-rotatable chuck 13 and a rotatable and axially moveable chuck 14. One part WP1 to be welded is clamped in the jaws of the chuck 13 and the other part WP2 is clamped in the jaws of the chuck 14.

The chuck 14 is mounted on the spindle 16 which is mounted for rotation in one end of a load cylinder 17 in a manner which will be described in detail below with reference to FIG. 4.

One or more inertial weights 18 are also mounted on the spindle 16. The energy required to weld the parts WP1 and WP2 is stored in the inertial weights 18 by rotating the spindle and weights to a predetermined speed before the load cylinder is actuated to press the parts into engagement.

A motor 19 is used to accelerate the spindle 16 and the weights 18 to the desired rotational speed, and is then disconnected from the spindle before the parts are engaged in rubbing contact. The drive from the motor 19 to the spindle 16 includes a hydraulic coupling 21, which is effective to absorb slip during rapid acceleration, a belt drive 22, a hydraulic clutch 23, and a planetary transmission 24. The clutch 23 is used to disconnect the motor from the spindle, and the output of the planetary transmission 24 is spline connected to a coupling member 26 (see FIG. 4) which extends internally through the load cylinder 17 to a second splined connection to the spindle 16.

With continued reference to FIG. 4, a tubular member 27 having an outwardly extending annular piston 28 is mounted for reciprocation within the load cylinder 17. Pressurized hydraulic fluid supplied through conduits 29 and 31 acts on the piston 28 to move the piston in the desired direction.

The spindle 16 is mounted for rotation in one end of the tubular member 27 by ball bearings 32 and 33 and by a radial hydrostatic bearing indicated generally by the reference numeral 34 and described in greater detail below.

The coupling member 26, when coupled to the spindle 16 by splines 36, serves as a drive shaft for accelerating the spindle to the desired rotational speed. As shown in FIG. 4, the coupling member has splines 37 at the end opposite that connected to the spindle, and the splines 37 form a continuously engaged and axially slidable coupling with the planetary transmission 24 (not shown in FIG. 4.).

A disconnect cylinder 38 and piston 39 are mounted within the tubular member 27 for shifting the coupling member into and out of engagement with the spindle 16. The disconnect piston 39 is tubular, and the coupling member 26 is mounted for rotation within the interior of the piston by ball bearings 41 and 42. Hydraulic fluid for actuating the piston 39 between the disengaged position (shown in FIG. 4) and engagement with the spindle 16 is supplied through conduits 43 and 44. Since the disconnect piston 39 does not rotate with respect to either the tubular member 27 or the load piston 17, no rotary seals are required between these components.

After the spindle 16 has been accelerated to the desired speed and the coupling member 26 has been disconnected from the spindle, the rotation of the coupling member 26 and the other elements of the drive train must be stopped. In the construction shown in FIG. 4 a brake, indicated generally by the reference numeral 46, is mounted between the tubular member 27 and the coupling member 26.

When the coupling member 26 is shifted to the position shown in FIG. 4 a friction facing 47 carried on the flange member 48, fixed for rotation with the coupling member 26, is pressed against a disc 49 mounted on an annular member 51. The annular member 51 is in turn mounted on the tubular member 27 so as to be non-rotatable. Thus, when the friction facing 47 is pressed against the disc 49 the coupling member 26 and associated drive components in the planetary transmission are braked to a stop. The coupling member 26 is then ready for reengagement with the spindle 16 at the beginning of the next cycle of operation.

The load cylinder and spindle construction shown in FIG. 4 includes a hydrostatic bearing, indicated generally by the reference numeral 52, for taking the axial thrust developed in the spindle 16 when the parts to be welded are engaged in rubbing contact. Pressurized hydraulic fluid from the hydraulic chamber 50 of the load cylinder 17 is conducted to a hydraulic chamber 53 of the hydrostatic bearing by a conduit 54. The hydraulic chamber 53 is effective to transmit hydrostatic pressure between the end face 56 of the spindle 16 and an annular face 57 on the tubular member 27. The areas of these two faces are equal. These areas are also preferably made equal to the annular area of the piston 28 so that the hydrostatic bearing 52 exactly counterbalances the load exerted by the load piston 28.

The forward end of the coupling member 26 includes a radially projecting flange portion 58 and an axially projecting ring portion 59 which mounts the splines for engagement with the splines 36 of the spindle 16. Since the area of the annular surface 57 is equal to the area of the circular surface 56, the area of the forward facing circular surface of the coupling member 26 is also equal to the area of the rearward facing annular surface of the flange 58. There is therefore no axial unbalance of forces on the portion of the coupling member which is located within the hydrostatic bearing 52, and the coupling member 26 can be freely moved in an axial direction without interfering with the hydrostatic support for the spindle 16.

The flange portion 58 is also formed with a plurality of apertures 61 which serve to transmit pressurized fluid freely between the opposite faces of the flange.

The clearance between the ring portion 59 of the coupling member and the associated cylindrical surfaces of the tubular member 27 and the spindle 16 is maintained quite small to produce capillary seal areas as indicated by the reference numerals 62, 63 and 64. These capillary seal areas permit controlled leakage from the hydrostatic bearing, and the controlled leakage is used as lubricant for the bearings 33, 42 and 41.

A chucking cylinder 66 and a chucking piston 67 are located within the spindle 16 to provide power actuation for the chuck 14. Conduits 68 and 69, connected to conduits 71 and 72 in the tubular member 27, transmit the pressurized hydraulic fluid to the cylinder for actuating the piston 67.

The opposed cylindrical surfaces of the spindle and the tubular member 27 are just slightly spaced from one another and permit a controlled leakage from the chambers of the chucking cylinder. The pressurized fluid flowing through the passageways between the cylindrical surfaces, as indicated by the reference numerals 73, provides radial support for the spindle 16 and also serves to lubricate the bearing 32 and 33. Thus, the pressurized fluid flowing through the passageways 73 provides the radial hydrostatic bearing indicated generally by the reference numeral 34 as noted above.

With continued reference to FIG. 4, a tachometer pickup 80 is mounted on the tubular member 27 and senses the rotational speed of the spindle 16 through a magnetic pick-up of the rotational speed of a tooth disc 82 attached to the spindle 16. The tachometer 80 is in turn used to control the declutching of the clutch 23 and subsequent disconnecting of the coupling member 26 from the spindle 16, as indicated by respective points A and B on the speed curve of FIGURE 9 and described in greater detail below with reference to the control circuit shown in FIGS. 6 through 8. As will also be pointed out in greater detail below, this sequence of first disconnecting the clutch 23 and then disconnecting the coupling member 26 permits the coupling member to be disconnected from the spindle during a period of little or no torque to prevent undue wear or damage to the spline teeth of the coupling member and the spindle. This sequence also permits the weld cycle to be initiated when the spindle is decelerating to provide more accurate control of the initial welding velocity and thus to avoid variation in the amount of energy available for making a weld.

Figure 5:
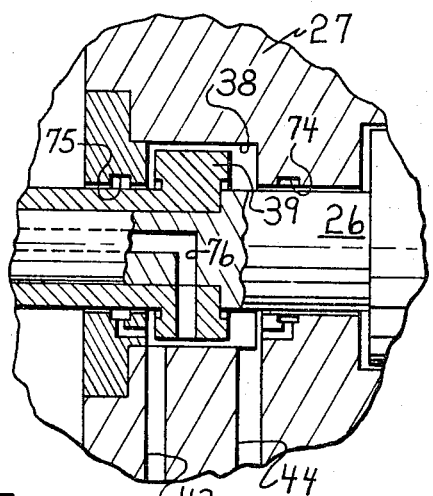
FIG. 5 is a fragmentary view in cross-section of a modified bearing arrangement for the drive shaft of the spindle as shown in FIG. 4 and shows hydrostatic bearing pockets which provide radial support for the drive shaft.

With reference now to FIG. 5, the coupling member 26 may also be mounted for rotation in hydrostatic bearings rather than the ball bearings as illustrated in FIG. 4. In the construction shown in FIG. 5 a pair of annular grooves 74 and 75 form radial bearing pockets and are located adjacent to the disconnect piston 39 to provide radial hydrostatic support for the shaft portion of the coupling member 26. The hydrostatic support is obtained from controlled leakage of the pressurized fluid from the hydrostatic chamber of the chucking cylinder 38. The controlled leakage is provided by the close fit between the opposed cylindrical surfaces of the tubular member 27 and the coupling member 26 at either end of the disconnect cylinder.

In the construction shown in FIG. 5 the disconnect piston 39 may be mounted for rotation with the coupling member 26. The piston 39 may also preferably include a conduit 76 for conducting pressurized fluid from the periphery of the piston 39 to the splined coupling 37 to serve as lubricant for the coupling.

The welding cycle for an inertial welder can be initiated as the spindle reaches a predetermined velocity. The spindle will, however, accelerate somewhat beyond this predetermined speed in the time required for a complete disengagement of a clutching device between the motor and the spindle, and the velocity of the spindle at the time the parts are engaged under pressure will then be somewhat greater than the predetermined speed at which the drive is disconnected. If the spindle overspeed was consistently to the same value of the predetermined speed, allowance could be made for this overspeed such that the weld would be initiated when the spindle reaches the desired welding speed. Overspeeding of the spindle varies, however, with the temperature of the machine and oil therein and is also affected by adjustment and wear of the bearings and the rotating parts. Since this variation in spindle overspeed will result in varying amounts of energy being available to the weld interface and thus cause inconsistency in the weld achieved, it is desirable that some means be provided to avoid this inconsistency in the amount of energy available with the weld.

In addition, the spindle construction shown in FIG. 4 requires a period of little or no torque between the time when the drive motor is disconnected and the parts are brought into contact under pressure to allow disengagement of the coupling member from the spindle.

As shown in FIG. 4 and previously described, a magnetic pick-up 80 (see FIG. 6) is provided to sense the speed of the spindle by its close proximity to a tooth wheel 82 carried by spindle 42 for rotation therewith. As the teeth on wheel 82 pass the magnetic pick-up 80, pulses of electrical energy are generated which are, in turn, transmitted to a frequency converter 130 where these pulses are converted to a DC output.

The DC output is, in turn, directed to an optical meter relay 132 to energize the photo-conductive cells contained in the meter relay. The meter relay is used to set the high and low speed limits by adjustment of the appropriate needles in relation to an r.p.m. scale such that as the spindle speed reaches its desired limits the light beams from the photo-conductive cells are interrupted to energize relays in a control module 134.

Figure 7:
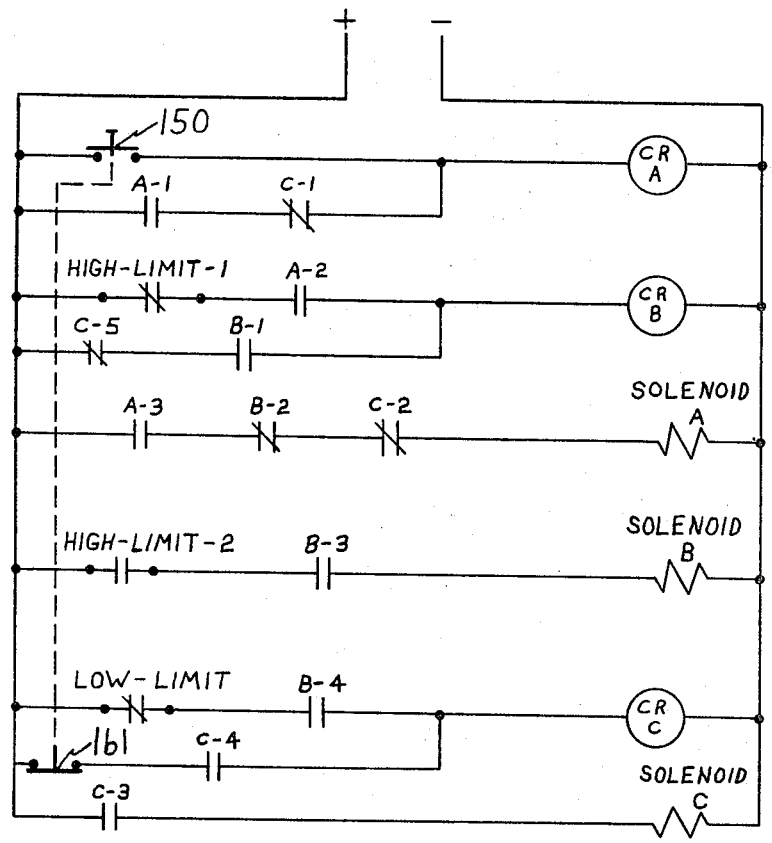

The control module is in turn wired to a relay panel 136 with the electrical components shown in FIG. 7 being contained in the relay panel and the control module.

Referring now to Sketch FIG. 7 when the operator pushes the start cycle button 150, the following sequence of operation occurs.

A control relay CR-A is energized such that a normally open contact A-1 closes and seals in relay CR-A through the normally closed contact C-1. Energizing of relay CR-A also closes a normally open contact A-2 and sets up control relay CR-B to be energized later when the high limit setting is reached and normally closed Hi-Limit-1 contact closes. Energizing of control relay CR-A also closes contact A-3 and energizes a solenoid A through normally closed contacts B-2 and C-2.

Control relay CR-C is de-energized (if energized from previous cycle).

Energizing of solenoid A shifts a clutch control valve 152 as shown in FIG. 8 to communicate fluid pressure to the appropriate end of clutch actuator 154 to engage clutch 23 and connect the motor 19 (FIG. 1) to the spindle. This causes the spindle to accelerate toward a pre-set high speed. When the pre-set high speed is reached, the high limit relay (not shown) in the optical meter is de-energized.

As the spindle accelerates, the low-limit relay will be energized and open Lo-Limit Contact (see FIG. 7) with no effect at that time.

When the high limit relay in the optical meter is de-energized, the Hi-Limit-1 contact closes and energizes control relay CR-B through normally open contact A-2 which is already closed as described above. The normally open contact B-1 closes and seals in relay CR-B through normally closed contact C-5. Normally closed contact B-2 opens and de-energizes solenoid A such that valve 152 (FIG. 8) returns to the position shown to disengage the clutch and disconnect the drive motor from the spindle. The spindle will overspeed slightly due to the time delay which occurs between the Hi-Limit setting being reached and the clutch being fully disengaged. During this overspeed period, appropriate controls (not shown) are energized to direct fluid pressure to chamber 60 (FIG. 4) to shift piston 28 to the left and disconnect the coupling member 26 from spindle 16. Normally open contact B-3 will close and set up the solenoid B (FIG. 7) to be energized through normally open Hi-Limit-2 contact which closes after the overspeed is expended. Normally open contact B-4 closes and sets up control relay CR-C to be energized when the spindle comes to a stop at the end of the welding operation through the normally closed Lo-Limit Contact (this contact actually opens before Hi-Limit-1 Contact closes). Hi-Limit-2 Contact opens but the opening of the contact produces no effect at this time.

After the overspeed is expended and the spindle speed drops back down to slightly below the pre-set Hi-Limit (by an amount inherent in the meter relay circuit and known as "deadband") the Hi-Limit relay will again be energized. The Hi-Limit-1 Contact opens and resets for next cycle. Hi-Limit-2 Contact closes and energizes solenoid B through closed, normally open Contact B-3. This shifts a valve 156 to the left and communicates pressure to the hydraulic actuator 158 and shifts a ram control valve 160 to the right. This is effective to communicate pressure to load cylinder 17 and to move load piston 28 to the right to bring the parts to be welded into contact under pressure. As the parts weld together, the spindle speed will be reduced to zero, causing the Lo-Limit relay to be de-energized.

The Lo-Limit relay is de-energized when the spindle speed drops to zero. The Lo-Limit contact then closes and energizes control relay CR-C through closed normally open contact B-4 (described above). Normally open contact C-4 will close and seal in relay CR-C through normally closed contact 161 on the start cycle button. Normally closed contact C-1 will open and de-energize relay CR-A resetting contacts A-1, A-2 and A-3 for the next cycle. Normally closed contact C-2 will open and maintain the clutch solenoid A de-energized. Normally open contact C-3 will close and energize the ram return solenoid C (see FIG. 8). Valve 156 will be shifted to the right from the position shown to communicate fluid pressure to a hydraulic actuator 162 and to shift valve 160 to the left from the position shown. This communicates fluid pressure to chamber 50 and shifts ram piston 28 (see also FIG. 4) to the left to return the ram and spindle to the starting position for the next cycle. Normally closed contact C-5 will open and de-energize relay CR-B resetting contacts B-1, B-2, B-3 and B-4

(resetting contact B-3 will de-energize the ram forward solenoid B).

The above described sequence of operation allows a period of spindle overspeed after the motor is disconnected from the drive shaft. This permits the coupling member to be disconnected from the spindle during a period of little or no torque to prevent undue wear or damage to the spline teeth 36. This also permits the weld cycle to be initiated when the spindle is decelerating (point B on the curve shown in FIG. 9) to provide more accurate control of the initial welding velocity and thus avoid variation in the amount of energy available for making a weld.

Figure 3:
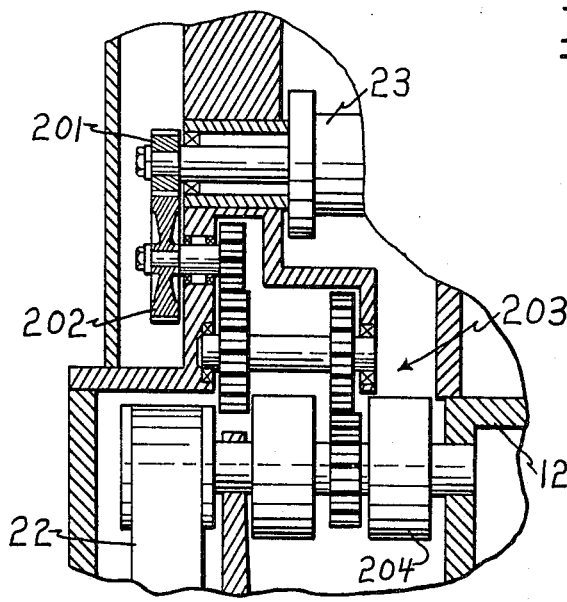
FIG. 3 is a fragmentary view showing a modified drive arrangement which provides change gears for varying the driven speed of the spindle of the machine shown in FIG. 1.

An alternate drive arrangement is shown in FIG. 3. The drive arrangement shown in FIG. 3 includes a set of gears 201 and 202 located so as to be readily replaceable with gears of different pitch diameters to vary the speed of the spindle for any given speed of the motor 19.

In the drive arrangement shown in FIG. 3 the drive from the motor to the belt 22 is the same as that shown in FIG. 1. The planetary gearing 24 of the FIG. 1 arrangement is replaced by the gear set indicated generally by the reference numeral 203 in FIG. 3.

The drive arrangement shown in FIG. 3 also includes a brake 204 for stopping rotation of the gear set after the motor has been declutched from the spindle.

Figure 2:
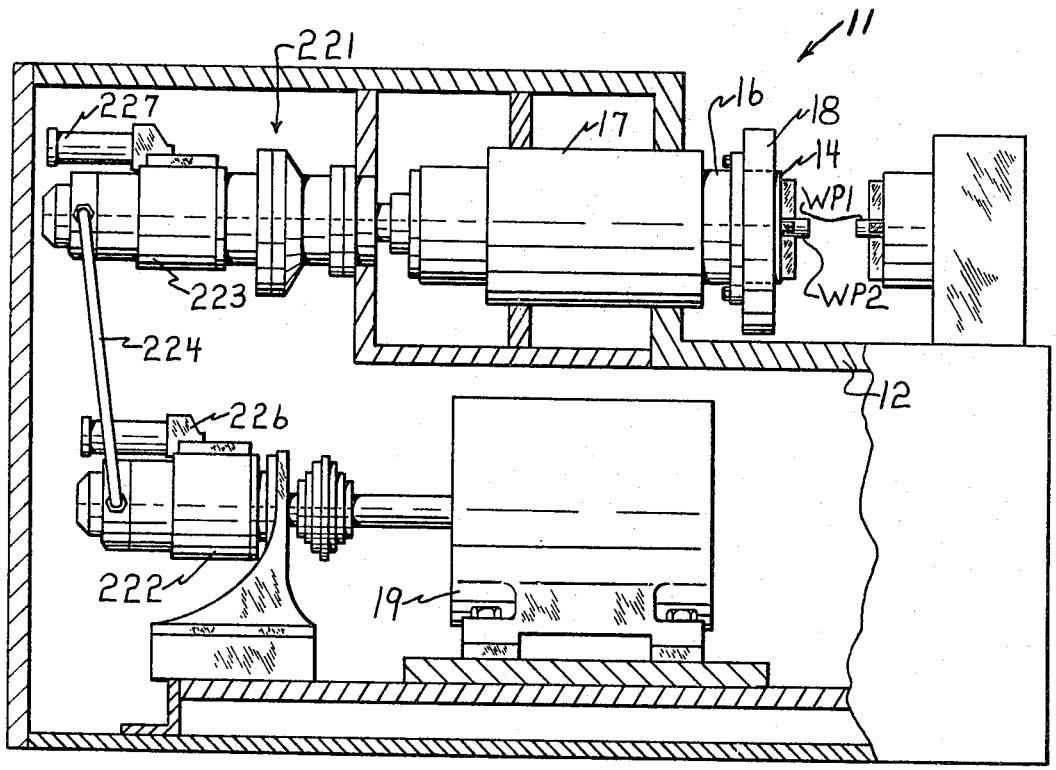
FIG. 2 is a view like FIG. 1 but shows a machine which incorporates a hydrostatic drive as the drive means between the motor and the spindle.

FIG. 2 shows a welding machine which incorporates a hydrostatic drive between the motor 19 and the spindle for accelerating the spindle to the desired rotational speed and then disconnecting the motor from the spindle.

The hydrostatic transmission, indicated generally by reference numeral 221, includes a variable displacement hydrostatic pump 222 and a variable displacement hydrostatic motor 223. The pump is connected to the motor by a manifold 224. The pump includes a displacement control 226, and the motor includes a displacement control 227.

The hydrostatic transmission shown in FIG. 2 replaces the hydraulic coupling 21, belt 22, clutch 23 and planetary gear set 24 of the arrangement shown in FIG. 1. When the displacement control of the motor 223 brings the motor to zero displacement the drive from the motor to the spindle is discontinued. The transmission effectively serves as a clutch for decoupling the motor from the spindle in this mode of operation.

The rate at which the motor accelerates the spindle 16 can be varied by varying the speed ratio produced by the hydrostatic transmission. In a preferred mode of operation the displacement of the pump 222 is set at zero at the beginning of the weld cycle, and the displacement of the motor 223 is set at a maximum. The acceleration of the spindle 16 is then accomplished by increasing the pump displacement to a maximum setting and then decreasing the motor displacement towards a minimum value. When the spindle reaches the desired rotational speed, the pump displacement is then quickly reduced to zero and the spindle freewheels. The parts to be welded can then be brought into contact under pressure to accomplish the weld.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A disconnect drive for the spindle of an inertial welding machine of the kind in which end surfaces of two parts to be welded are pressed together while the stored energy of a rotating inertial weight rotates the parts in rubbing contact to heat the engaged surfaces to a plastic weldable condition, said disconnect drive comprising, a load cylinder attached to the machine frame,
a tubular load piston mounted for axial movement within the load cylinder,
a spindle mounted for rotation in one end of the tubular piston,
and drive means for rotating the spindle and including a coupling member which is axially moveable within the tubular piston for connecting and disconnecting the drive means and the spindle during different parts of a weld cycle.

2. A disconnect drive as defined in claim 1 including a splined connection between the coupling member and the spindle which is disconnected by shifting the coupling member away from the spindle.

3. A disconnect drive as defined in claim 1 including a brake for stopping the drive means after the spindle is disconnected from the drive means.

4. A disconnect drive as defined in claim 1 including change gears in the drive means for varying the driven speed of the spindle.

5. A disconnect drive as defined in claim 1 wherein the drive means include a variable speed hydrostatic pump and motor.

6. A disconnect drive as defined in claim 1 including a disconnect cylinder and piston within the tubular piston with the disconnect piston connected to the rotatable coupling member for moving the coupling member into and out of drive engagement with the spindle.

7. A disconnect drive as defined in claim 6 including hydrostatic radial bearing pockets located adjacent the disconnect cylinder and piston to provide radial hydrostatic support for the rotating coupling member by controlled leakage of pressurized fluid from the disconnect cylinder.

8. A disconnect drive as defined in claim 1 including a chuck on the spindle for holding one of the parts to be welded and a chucking cylinder and piston within the spindle for clamping and unclamping the chuck.

9. A disconnect drive as defined in claim 8 including mechanical radial support bearings for the spindle, conduit means for conducting pressurized fluid from the tubular piston through the spindle to the chucking cylinder and passageways for conducting a controlled leakage from the conduit means to the mechanical bearings to serve as lubricant for the bearings.

10. A disconnect drive as defined in claim 1 including a hydrostatic bearing between the spindle and the tubular piston for taking the axial thrust developed on the spindle when the parts to be welded are engaged in rubbing contact.

11. A disconnect drive as defined in claim 10 wherein the coupling member includes a flange which is disposed within the chamber of the hydrostatic bearing and which has apertures for freely transmitting pressurized fluid through the flange.

12. An inertial welding machine of the kind in which the end surfaces of two parts to be welded are pressed together while the stored energy of a rotating inertial weight rotates the parts in rubbing contact to heat the engaged surfaces to a plastic weldable condition, said machine comprising, a first non-rotatable chuck for holding one part, a second rotatable chuck for holding the other part, a rotatable spindle on which the rotary chuck is mounted, means for connecting an inertial weight for rotation with the spindle, loading means for moving the chucks towards one another to press the parts into rubbing contact with the desired force, a motor, and a hydrostatic transmission between the motor and rotatable spindle for connecting the motor in drive relation with the spindle and inertial weight.

13. An inertial welding machine of the kind in which end surfaces of two parts to be welded are pressed together while the stored energy of a rotating inertial weight rotates the parts in rubbing contact to heat the engaged surfaces to a plastic weldable condition, said machine comprising, a stationary chuck for holding one part, a rotatable and axially moveable spindle mounting a chuck for holding the other part, a load cylinder attached to the machine frame, a tubular piston mounted for axial movement within the load cylinder, bearing means mounting the spindle for rotation in the tubular load piston, drive means including a motor, a clutch, and a coupling member releasably coupled to the spindle, and control means including spindle speed sensing means effective to declutch the motor from the coupling member at a preselected speed, then to decouple the coupling member from the spindle during a period of no torque, and then to actuate the loading piston to engage the parts to be welded as the speed of the spindle decreases to a preselected speed.

References Cited

UNITED STATES PATENTS 3,134,278   5/1964   Hollander _____ 228—2

RICHARD H. EANES, JR., *Primary Examiner.*